United States Patent Office 3,443,226
Patented May 6, 1969

3,443,226
REBALANCE VOLTAGE MEASURING APPARATUS EMPLOYING AN A.C. POTENTIOMETER
Richard B. D. Knight, Salisbury Grove, Mytchett, Aldershot, Hampshire, England
Continuation-in-part of application Ser. No. 274,433, Apr. 22, 1963. This application May 2, 1966, Ser. No. 546,791
Int. Cl. G01r 17/02, 17/06
U.S. Cl. 324—99                              6 Claims

ABSTRACT OF THE DISCLOSURE

The apparatus is an automatically rebalanced voltmeter wherein an unknown voltage is compared with a digital known voltage and the digital known voltage adjusted to equal the unknown voltage. The digital known voltage is generated by a series of tapped transformer windings controlled by a digital device stepped in response to the difference between the unknown and the known voltage.

---

This application is a continuation-in-part application filed in pursuance of application Ser. No. 274,433 filed on Apr. 22, 1963, and now deemed abandoned.

This invention relates to direct current measurement, and more particularly to D.C. voltmeters of the kind wherein the unknown voltage to be measured is compared with a known applied voltage itself effectively varied by voltage changing devices so as to balance the unknown voltage, and the magnitude of the varied applied voltage is displayed by indicators which provide the required voltage measurement. It is known to provide such a voltmeter wherein the voltage changing devices consist of a potentiometer arranged in the Kelvin-Varley principle to divide a reference voltage from a stable D.C. supply, for example from a temperature controlled Zener diode, and wherein the voltage from the potentiometers is compared with the unknown voltage to be measured by means of mechanically driven switch known as a "chopper" which provides a square wave input to an amplifier which provides signals which are used to drive the indicators and the moving contacts of the potentiometers. The phase of amplified signal relative to the movement of the chopper depends on whether the potentiometer setting is too high or too low with respect to the unknown voltage and is used to control the potentiometer in order to drive it towards balance. When balance is obtained the indicators come to rest and contacts may control current to lamps which illuminate the appropriate numerals in a set of indicator windows. Because of the accuracy of resistors used to divide the applied reference voltage, the accuracy of this type of voltmeter is limited to about 0.01 percent at present and even to achieve this degree of accuracy requires precision wirewound resistors which must have matched temperature coefficients or must be maintained at a constant temperature.

An object of the invention is to provide an apparatus by which a higher degree of accuracy is obtained than is possible with potentiometer resistors.

According to the invention there is provided a direct current voltmeter including (a) A plurality of inductively-coupled variable voltage divider windings adapted to be connected to a source of A.C. voltage, (b) Signal storage means in the form of a capacitor for receiving the unknown direct current voltage to be measured, (c) Balance detecting means including an amplifier, which means compare a derived A.C. voltage from the divider with the charge due to the unknown direct current signal stored in the capacitor, (d) A switch device to connect alternately the unknown D.C. voltage and the A.C. voltage derived from the divider windings to the balance detecting means, and (e) Indicating means connected to said balance detecting means to receive an amplified output therefrom so that when the derived A.C. voltage and the unknown D.C. voltage have a predetermined relationship to each other the indicating means shows the value of the D.C. voltage.

The voltage comparison may be effected over a short period of time during which the alternating voltage change is negligible, or alternatively, a portion of the alternating current wave during which the change is small may be integrated before the comparison.

By using an alternating current supply for measurement of a direct current voltage, it is thus possible to use inductively-coupled variable voltage dividers which can themselves be made to provide a much higher degree of accuracy than is possible with potentiometer resistors. These inductively-coupled voltage dividers, also known as ratio transformers, are known for A.C. voltage measurement, see Paper No. 3856M, March 1962. The Institution of Electrical Engineers, vol. 109, pages 157–162. Inductively-coupled voltage dividers for the purpose of the present invention may be constructed in accordance with this paper.

Several constructional forms of the invention will be described by way of example with reference to the accompanying diagrammatic drawings wherein.

Figure 1:
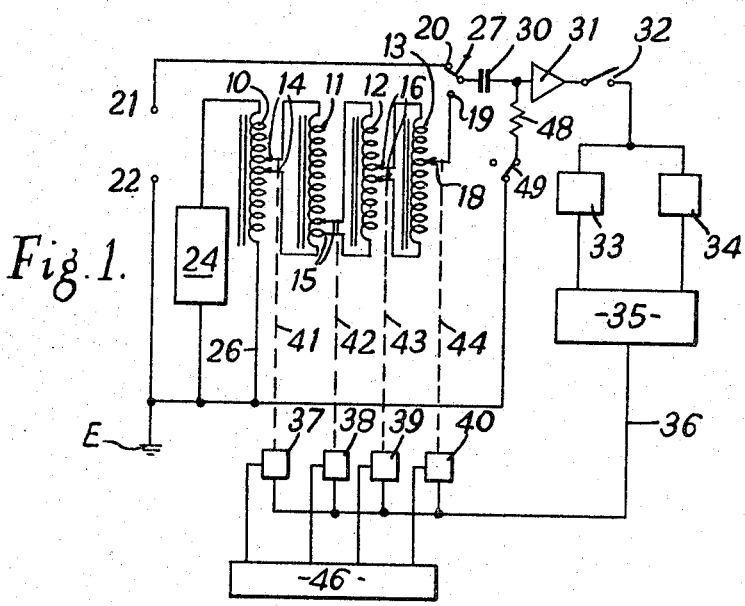
FIGURE 1 is a diagram of an apparatus made in accordance with the invention wherein the inductively coupled voltage dividers have automatically actuated sequentially switched voltage selecting contacts.

In the construction shown in FIGURE 1, a ratio transformer comprises four windings 10, 11, 12, 13 tappings on the first three of which are selectable by pairs of moving contacts 14, 15, 16 each connected across the next winding to form a cascade arrangement. The winding 13 has taps selectable by a moving contact 18 connected to a terminal 19. A corresponding terminal 20 is connected to an input terminal 21. The other input terminal 22 is connected to earth E. The unknown D.C. voltage to be measured is applied across terminals 21, 22. The input end of the cascade arrangement is connected to a square-wave A.C. supply of known type indicated at 24 i.e. this supply is connected between coil 10 and earth E. Winding 10 is connected at 26 to earth.

A first mechanically driven chopper or switch device 27 is permanently connected to a capacitor 30 (e.g. 1 mfd.), the other plate of which is connected to a D.C. amplifier 31, and the chopper is arranged to alternately connect the capacitor to terminals 19, 20. The D.C. amplifier 31 is connected by a second switch device or chopper 32 to a sensing or memory device indicated diagrammatically as a "too low" storage 33 and a "too high" storage 34, these being connected to a driving means 35 having an output 36 coupled to uni-selectors 37, 38, 39, 40 themselves respectively coupled by driving connections 41, 42, 43, 44 to the moving contacts 14, 15, 16 of the ratio transformer. The uni-selectors 37, 38, 39, 40 are also connected to an indicator display panel 46.

The input of the D.C. amplifier 31 is able to be connected to earth through a resistor 48 (e.g. 10K) and a third chopper 49.

The A.C. supply means 24 provides a square wave signal of accurately defined amplitude or may provide a wave signal, the form of which includes a portion of low rate of change relative to other portions of the same wave. The signal from the A.C. supply 24 is accurately divided by the ratio transformer.

The choppers 27, 32, 49 are arranged to change over as hereinafter described. In order to obtain negative and positive half cycles of the A.C. waveform on each dwell of the chopper 27, choppers 27 and 49 may be operated at half the frequency of the A.C. supply or slower.

When chopper 27 connects the input of the D.C. amplifier 31 to the unknown voltage, chopper 49 is closed and contact 32 open so that the capacitor 30 charges through resistor 48 and the amplifier input and output signals become zero. Chopper 49 then opens and disconnects resistance 48 from earth so that the voltage across the capacitor 30 remains constant. Chopper 27 then changes over and connects with contact 19, and a square wave is fed from the ratio transformer to the D.C. amplifier 31. If the output from the ratio transformer were an ideal square wave, and the amplitude had been set so that the positive half wave were exactly equal in amplitude to the (positive) unknown D.C. voltge, then the plate of the capacitor 30 connected to chopper 27 will be at the same potential as the D.C. signal and therefore the output of the D.C. amplifier 31 will be zero, indicating balance. During negative half cycles of the A.C. waveform from the ratio transformers, a large signal will occur indicating a gross unbalance (which latter occurs when switch 32 is open.

A delay circuit (not shown) is arranged to close the switch 32 for a short time during the positive half cycle. of the A.C. waveform, say one quarter milli-second after its beginning and the closure of switch 32 causes the amplifier output signal, itself indicative of the latter's balance condition, to pass to a memory device, where it is stored. Any difference between the instantaneous value of the ratio transformer A.C. output and the D.C. voltage input being measured, appears as an unbalance signal from the amplifier 31. For example, when measuring a positive D.C. voltage, a positive unbalance signal will be transmitted to the memory device if the setting of the ratio transformer is too high, and a negative unbalance if the setting is too low. These unbalance signals are stored in the memory device and used to control the movement of the uni-selectors 37, 38, 39, 40 in order to obtain amplifier balance.

The operation of switch 32 is arranged so that always the same point in the A.C. wave-form is compared with the unknown D.C. input signal and hence the effects of possible imperfections in the A.C. waveform are eliminated, i.e. it is the instantaneous magnitude of the A.C. at a predetermined moment of the A.C. cycle (when the switch 32 opens) which is compared with the D.C. Thus an imperfect square wave, or even an arbitrary waveform, can be used provided that the time at which the switch 32 opens) which is compared with the D.C. Thus If the A.C. waveform has a suitable region for the comparison during its negative excursions in addition to that during its positive excursions, then the negative half cycles may be used for the measurement of negative D.C. input voltages and in the case the switch 32 would be arranged to close during the negative half cycles of the A.C. input, for example by delaying its closure by one quarter millisecond from the start of the negative excursion.

Windings 10, 11, 12, 13 of the ratio transformer may be constructed by winding 1,000 turns on to a toroidal core of 4.5″ outside diameter constructed of 0.002″ super-mumetal tape ⅝″ wide, wound in the form of a clock spring and protected by a plastic case. The winding may consist of a ten strand rope of 30 S.W.G. enamelled wire threaded 100 times through the toroid, the ten strands being connected in series to form the 1,000 turn winding, tapping points at intervals of 100 turns being provided by the series connecting points.

Alternative constructions include the use of several windings on one transformer core, as described in the said paper, and the use of resistance division of the A.C. voltage in the less significant stages of division.

It is also possible to arrange the switching of ratio transformer windings 10, 11, 12, 13 so that the voltages obtained from each of them have a binary or a binary decimal relationship to each other.

The memory device may comprise two bistable circuits 33, 34 of the Eccles-Jordan type.

The control drive means 35, uniselectors 37, 38, 39, 40 and display means 46 may be as described in the Journal of the British Institution of Radio Engineers, July 1960, vol. 20, pages 536–540.

Instead of the voltmeter described having means for effecting automatic adjustment of the radio transformer output voltage, this may be effected manually.

Figure 2:
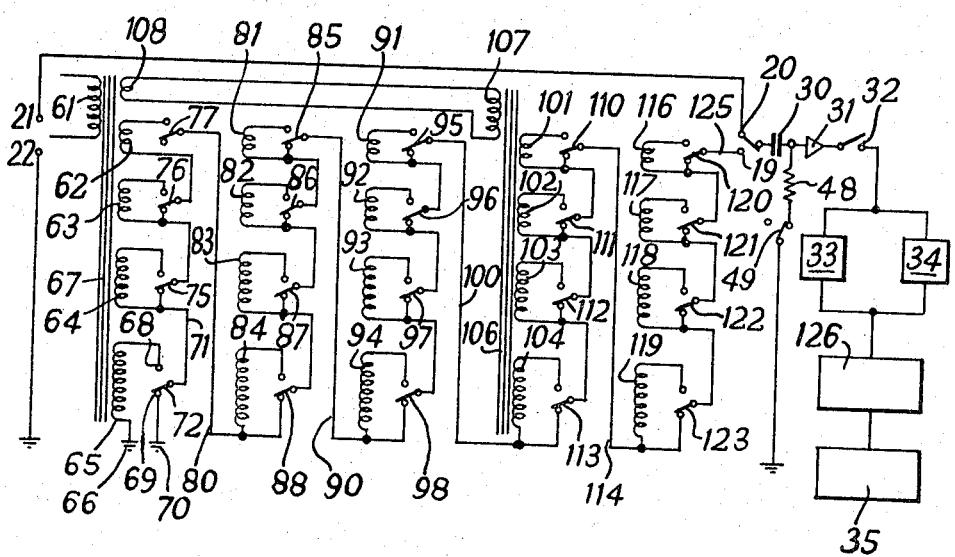
FIGURE 2 is a diagram showing a further construction in which the voltage division is controlled by relay controlled switches.

Instead of selecting serially connected transformer winding sections, as in FIGURE 1, the said sections may themselves be selectively interconnected as described below. Thus as shown in FIGURE 2, inductively coupled A.C. voltage dividing windings 62, 63, 64, 65 are wound on a common core 67 on which also is wound a primary coil 61 fed with A.C. Winding 65 has one end connected to earth at 66 and the other end connected to one contact 68 of a pair of contacts 68, 69, the latter being connected to earth at 70. A switch or relay 72, 68, 69 can connect the winding 64 either to earth directly or through winding 65. Windings 62, 63, 64, 65 have similar relay contacts 75, 76, 77 so that any of the windings may be bypassed or connected in series as required.

Output 80 from this set of windings is connected to a second set of windings 81, 82, 83, 84 wound on the same core and similarly provided with relay contacts 85, 86, 87, 88.

Output 90 from the second set of windings is connected to a third set 91, 92, 93, 94 again wound on the same core and provided with relay 95, 96, 97, 98.

The output 100 from the third set of windings is connected to a fourth set of windings 101, 102, 103, 104 wound on a separate core 106 which carries a winding 107 fed with A.C. from a winding 108 on the first core 67. The windings 101, 102, 103, 104 are operatively associated with relays 110, 111, 112, 113 and the output 114 is connected to a fifth set of windings 116 117, 118, 119, these being wound on core 106, and having relays 120, 121, 122, 123 operationally associated therewith.

Output 125 from the fifth set of windings is connected to contact 19 operatively associated as in FIGURE 1 with a capacitor 30, a resistor 48, chopper 49, D.C. amplifier 31 and memory devices 33, 34 the latter in this case being operatively associated with relay control device 126 and display device 35.

As an example the windings may be arranged to bear decade relationships to each other and may thus be provided with the following turns:

First decade consists of windings 62, 63, 64, 65 having respectively 100, 200, 400, 800 turns.

Second decade consists of windings 81, 82, 83, 84 having respectively 10, 20, 40, 80 turns.

Third decade consists of windings 91, 92, 93, 94 having respectively 1, 2, 4, 8 turns.

Fourth decade consists of windings 101, 102, 103, 104 having respectively 100, 200, 400, 800 turns.

Fifth decade consists of windings 116, 117, 118, 119 having respectively 10, 20, 40, 80 turns.

Coupling windings 108 and 107 may consist of 1 turn and 1000 turns respectively.

The sequence of switching operations to achieve voltage balance with an unknown D.C. signal may, for example, be as follows:

(1) Set all relay contacts to by-pass all windings.

(2) Transfer contact 72 to contact 68, bringing in winding 65.

(3) If the instantaneous A.C. voltage output at contact 19 exceeds the D.C. input, return contact 72 to contact 69. If the said A.C. voltage is less than the D.C. input, leave contact 72 on contact 68.

(4) Transfer the moving contact of relay 75 to connect winding 64 in series with the output on wire 71. The final position of this contact is determined by whether the instantaneous A.C. voltage is greater than or less than the D.C. input.

(5) The final position of the moving contacts on relays 76, 77, 85, 86, 87, 88, 95, 96, 97, 98, 110, 111, 112, 113, 120, 121, 122, 123 are similarly determined.

Figure 3:
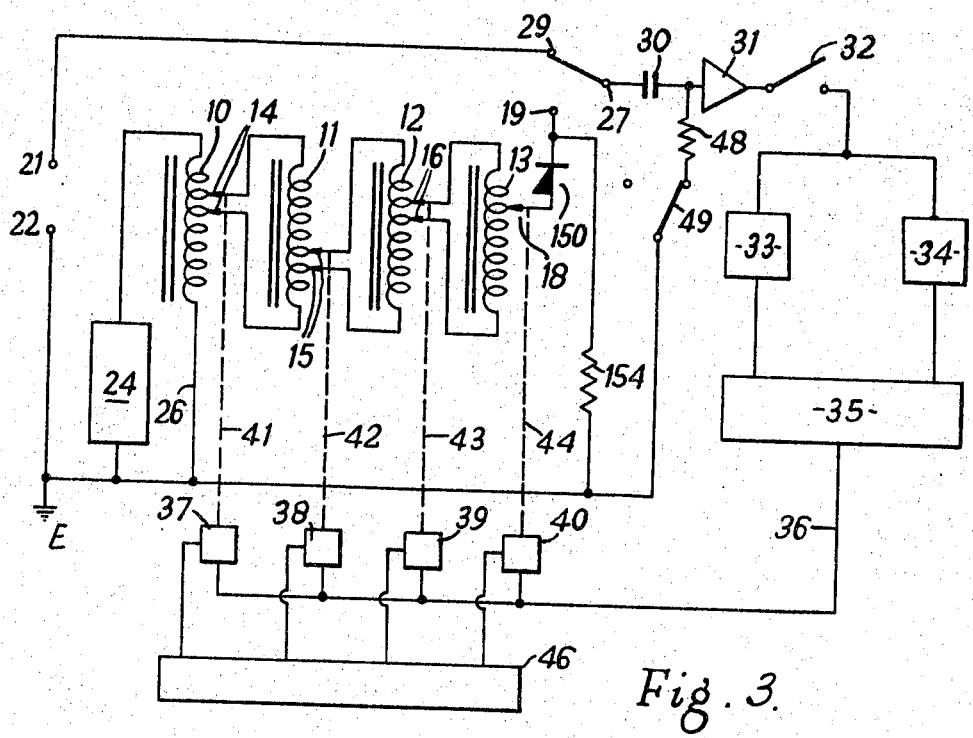
FIGURES 3 is a modification of FIGURE 1 in which rectifier means in the form of a diode is provided to rectify the A.C. voltage derived from the inductively coupled divider windings.

FIGURE 3 shows a circuit substantially the same as FIGURE 1 except for the addition of the diode, rectifier 150, connected between the contacts 18 and 19 and a diode load resistor 154 provided between contact 19 and the line connected to input terminal 22. Like components in the figures are identified by the same reference numerals.

The operation of the arrangement of FIGURE 3 is substantially the same as that of FIGURE 1 with the exception that when the chopper 27 changes over and connects with contact 19, the square wave derived from the ratio transformer is rectified by the diode 150 and the rectified voltage is fed to the D.C. amplifier 31. If the output of the ratio transformer were such that the magnitude of the D.C. voltage from the diode 150 were exactly equal to the unknown D.C. voltage of like polarity, then the plate of the capacitor 30 connected to the chopper 27 will be at the same potential as the unknown D.C. signal and therefore the output of the D.C. amplifier 31 will be zero indicating balance.

Whilst the rectification of the derived A.C. has been described as being effected by a diode 150, the rectification may be effected by semi-conductor or thermionic devices.

Figure 4:
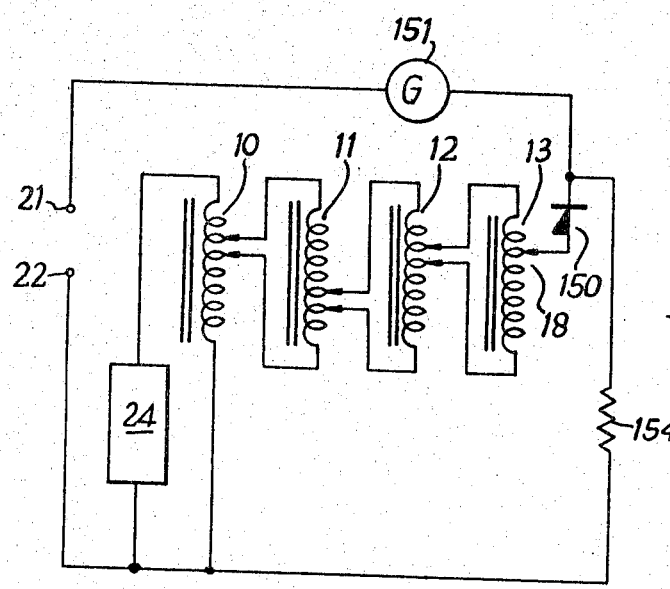
FIGURE 4 shows a simplified balance detector circuit including a galvanometer and a diode for rectifying the A.C. voltage derived from the divider.

FIGURE 4 depicts a simplified balance detector circuit comprising a galvanometer 151 connected to the unknown D.C. voltage at 21, 22 and the rectified voltage at diode 150 derived from the ratio transformer winding. In the above apparatus the settings of the ratio transformer taps are adjusted until balance is indicated on the galvanometer 151 and these settings may indicate the magnitude of the unknown D.C. voltage.

Figure 5:
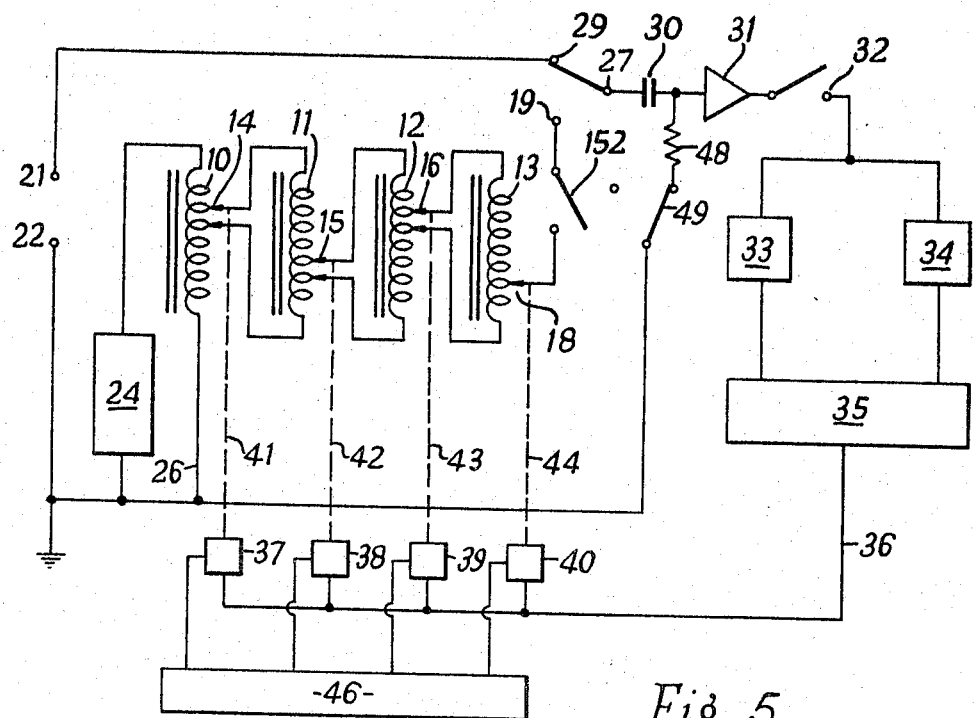
FIGURE 5 is a further modification of FIGURE 1 in which rectifier means in the form of a switch is provided to rectify the A.C. voltage derived from the divider.

FIGURE 5 depicts an alternative method of rectifying the A.C. derived from the A.C. divider windings. Thus, a contact 152 is arranged to be cyclically closed during the same period in the derived A.C. waveform so that synchronous rectification of the derived A.C. takes place. In one form of the modification to the arrangement described in FIGURES 1 and 2, the contact 152 is arranged to be driven in overlapping synchronism with switch 32 so that the closure of the latter is within the period that contact 152 is also closed.

As described with reference to FIGURE 5 a galvanometer or other D.C. responsive detector may be used as balance detecting means. Whilst the component effecting synchronous rectification has been described as a contact 152, mechanical, electro-mechanical, semi-conductor or thermionic switching devices may be utilised for this purpose.

I claim:

1. A direct current voltmeter including
   (a) a plurality of inductively-coupled variable voltage divider windings adapted to be connected to a source of A.C. voltage
   (b) signal storage means in the form of a capacitor for receiving the unknown direct current voltage to be measured
   (c) balance detecting means including an amplifier, which means compare a predetermined part of the A.C. source voltage at a predetermined moment of the A.C. cycle derived from the divider with the charge due to the unknown direct current signal stored in the capacitor to produce a D.C. error voltage,
   (d) a switch device to connect alternately the unknown D.C. voltage and the A.C. voltage derived from the divider windings to the balance detecting means, and
   (e) indicating means connected to said balance detecting means to receive an amplified output therefrom so that when the derived A.C. voltage and the unknown D.C. voltage have a predetermined relationship to each other the indicating means shows the value of the D.C. voltage.

2. A direct current voltmeter according to claim 1 in which said balance detecting means provides a signal to said indicating means when the instantaneous magnitude of the derived A.C. voltage at a predetermined moment of the A.C. cycle and the D.C. voltage to be measured are equal.

3. A direct current voltmeter according to claim 1, including movable voltage selector contacts on said variable voltage divider windings, and control means connected to the balance detecting means for driving said selector contacts in a direction so as to reduce the unbalance between the D.C. voltage and the instantaneous magnitude of the A.C. voltage.

4. A direct current voltmeter according to claim 2, wherein the balance detecting means includes "too high-too low" signal sensing means; and further having two further switch devices, one of said further switch devices being adapted to connect and disconnect alternately the connection between the capacitor and amplifier to ground and the other of said further switch devices being adapted to connect and disconnect alternately the output from the amplifier to said sensing means, said further switch devices being driven in synchronism with the first mentioned switch device and with the alternating current input supply in such a manner that when said one further switch device grounds the capacitor a D.C. current passes and charges the latter, the said one further switch device then opens so that the capacitor remains charged, the first mentioned switch then connects the capacitor to the divider windings and the other further switch device, which forms part of the balance detecting means, connects the amplifier output to said signal sensing means for a short time at a predetermined instant during at least one cycle of the amplifier signal, the magnitude of the amplifier output being dependant upon the difference between the D.C. and the A.C. voltages.

5. A direct current voltmeter according to claim 4, in which said other switch device is arranged to connect the output of the amplifier to the signal sensing means during the positive half cycle of the A.C. waveform.

6. A direct current voltmeter according to claim 1, including a rectifier means connected between the output of the divider windings and said first mentioned switch means and adapted to rectify the A.C. voltage from the divider windings to substantially D.C., said balance detecting means being adapted to compare the rectified A.C. voltage with the D.C. voltage to be measured.

References Cited

UNITED STATES PATENTS

| | | | |
|---|---|---|---|
| 3,159,787 | 12/1964 | Sexton et al. | 324—99 |
| 2,653,285 | 9/1953 | Gray | 324—98 |
| 2,775,754 | 12/1956 | Sink | 324—99 |
| 2,832,036 | 4/1958 | Cutler | 323—47 |
| 2,936,418 | 5/1960 | Young | 324—121 |
| 3,093,783 | 6/1963 | Hoss | 324—98 |

RUDOLPH V. ROLINEC, *Primary Examiner.*

E. F. KARLSEN, *Assistant Examiner.*

U.S. Cl. X.R.

323—91; 324—98, 111